Oct. 27, 1942.    M. C. KOESTER    2,299,827
PROCESS FOR MOUNTING GLASS PULLS
Filed Aug. 9, 1939    2 Sheets-Sheet 1

Inventor
MELVIN C. KOESTER.

By Frank Fraser
Attorney

Oct. 27, 1942.  M. C. KOESTER  2,299,827
PROCESS FOR MOUNTING GLASS PULLS
Filed Aug. 9, 1939  2 Sheets-Sheet 2
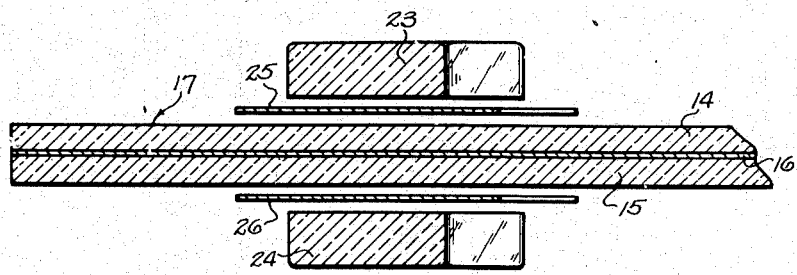
Fig. 4.
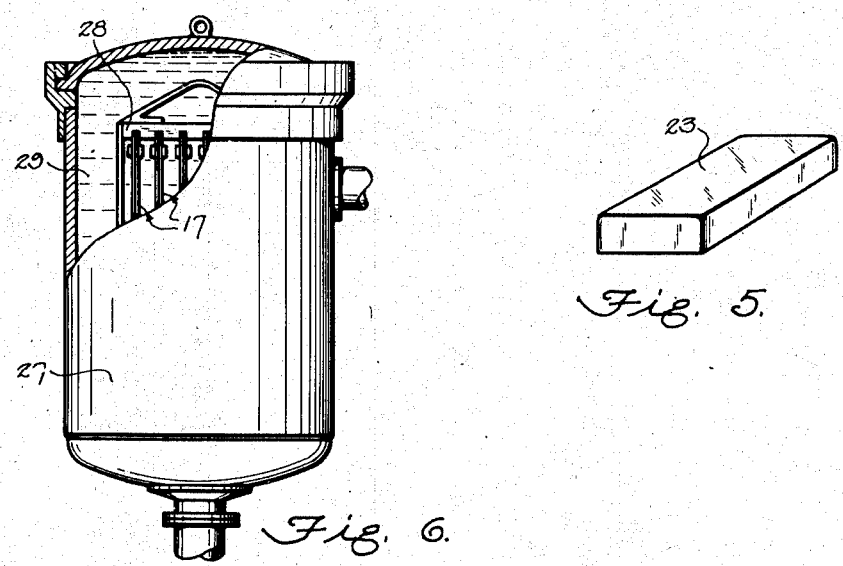
Fig. 5.
Fig. 6.
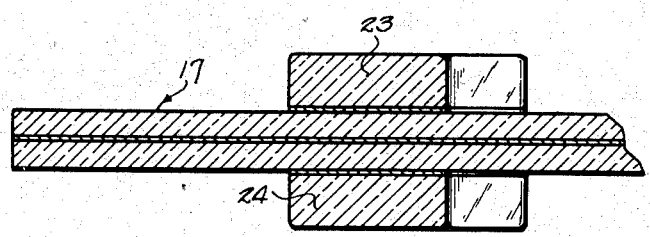
Fig. 7.
Inventor
MELVIN C. KOESTER.
By Frank Fraser
Attorney Patented Oct. 27, 1942

2,299,827

UNITED STATES PATENT OFFICE 2,299,827

PROCESS FOR MOUNTING GLASS PULLS

Melvin C. Koester, Toledo, Ohio, assignor to Libbey-Owens-Ford Glass Company, Toledo, Ohio, a corporation of Ohio Application August 9, 1939, Serial No. 289,111

2 Claims. (Cl. 49—81.5)

The present invention relates to an improved method of mounting glass pulls on glass doors, windows, partitions, and the like.

In limousines, taxicabs, and airplanes, where sliding glass windows or partitions are used, as well as in showcases, refrigerators, and the like, where sliding glass doors are employed, it is desirable that glass pulls be applied to the doors, windows, or partitions to facilitate the sliding movement thereof. Heretofore, it has been proposed to apply these glass pulls by means of a suitable adhesive or cement, but this method has not been particularly satisfactory for various reasons, among which may be mentioned the tendency of the pulls to eventually become detached from the glass, the squeezing out of the adhesive or cement around the edges of the pulls and the eventual discoloration of the adhesive or cement resulting in an unsightly appearance.

It is the aim of this invention to provide a process for mounting glass pulls upon glass doors, windows, or partitions in a manner to provide a permanent bond between the pulls and glass as well as one which will remain transparent so as not to mar the appearance of the door, window, or partition. Although the process of this invention is particularly applicable and is herein illustrated and described in the mounting of glass pulls upon sheets of laminated safety glass, it is to be understood that the process is equally applicable in the mounting of glass pulls upon single sheets or plates of glass.

Other objects and advantages of the invention will become more apparent during the course of the following description when taken in connection with the accompanying drawings.

In the drawings wherein like numerals are employed to designate like parts throughout the same:

Fig. 4 is a sectional view showing the application of the glass pulls to opposite faces of a laminated glass sandwich;

Fig. 5 is a perspective view of one of the glass pulls;

Fig. 6 is an elevation, partially in section, of an autoclave in which the laminated glass sandwiches may be subjected to final heat and pressure treatment and the glass pulls simultaneously secured thereto; and Fig. 7 is a sectional view showing a finished sheet of laminated glass provided with glass pulls.

Figure 1:
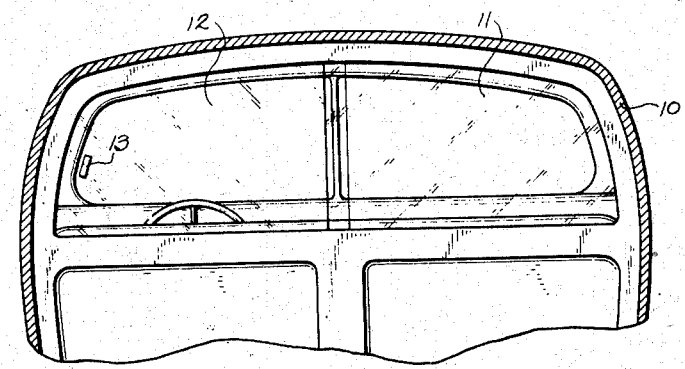
Fig. 1 is a diagrammatic transverse sectional view through a limousine or taxicab provided with a sliding partition between the driver and the occupants of the vehicle, showing one application of the invention.

With reference to the drawings, there is illustrated diagrammatically in Fig. 1 a portion of a limousine or taxicab 10 provided behind the driver's seat with a partition comprising the two glass panels 11 and 12. The glass panel 11 is preferably mounted in a fixed position while the panel 12 is mounted for horizontal sliding movement so that it may be opened to permit conversation between the driver and the occupants of the rear seat of the vehicle or for any other purpose. In order to facilitate the opening and closing of the panel 12, it is provided upon opposite surfaces and at the outer end thereof with glass pulls 13.

Each panel 11 and 12 preferably consists of a sheet of laminated safety glass made up of two sheets of glass 14 and 15 and an interposed layer 16 of plastic material bonded together to form a unitary structure. Although the invention is not limited to the use of any particular type of plastic material, it is preferred that the interlayer 16 be of a synthetic resin such as, for example, polyvinyl acetal resins. These resins are characterized by increased toughness and greater resistance to discoloration by light.

Figure 2:
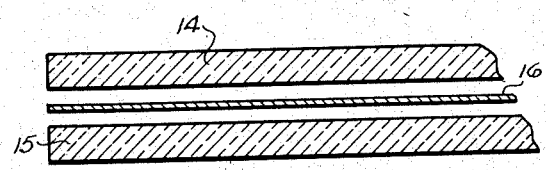
Fig. 2 is a transverse sectional view showing the assembling of two sheets of glass with an interposed layer of plastic material in the making of laminated safety glass.
Figure 3:
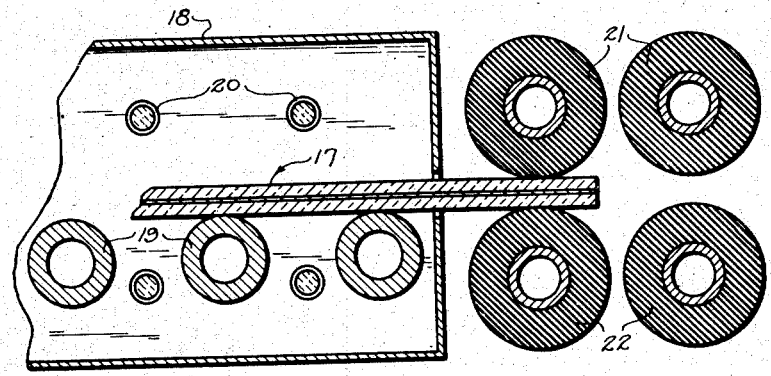
Fig. 3 is a vertical longitudinal sectional view through apparatus for subjecting the glass-plastic laminations to a preliminary pressing.

After the glass sheets 14 and 15 and interposed layer 16 of plastic material have been properly assembled with one another, as shown in Fig. 2, to provide a sandwich, the said sandwich is adapted to be subjected to a preliminary pressing operation to expel any air, non-condensable gases, etc. from between the laminations and to cause them to stick together to prevent the pressing fluid from creeping in between the laminations when the sandwich is placed in an autoclave where it is subjected to final pressure. This preliminary pressing treatment can be accomplished by passing the sandwich 17 (Fig. 3) through a heating chamber 18 upon a series of horizontally aligned rolls 19. The chamber 18 is heated in any desired manner such as by means of electric heating elements 20. After the sandwich has been properly heated within chamber 18 to cause the desired softening of the plastic interlayer, the sandwich is passed from said chamber between one or a plurality of pairs of pressing rolls 21 preferably of rubber or other resilient compressible material.

In the making of laminated safety glass, the sandwich, after being preliminarily pressed, is ordinarily submerged unprotected in a bath of fluid contained in an autoclave where it is subjected to the combined action of heat and pressure, the fluid coming into direct contact with the sandwich so as to effect a uniform application of heat and pressure from all sides thereof whereby to cause a bonding together of the several laminations to produce a composite structure. In such process, it has been found desirable that the sandwich, before being placed within the fluid bath, be subjected at least to a relatively light initial or preliminary pressing sufficient to cause the laminations to stick together in such a manner that the sandwich can be satisfactorily handled and treated in the autoclave.

After the sandwich 17 has been subjected to the preliminary pressure treatment above described, the glass pulls 23 and 24 (Fig. 4) are adapted to be applied to the outer surfaces of the glass sheets 14 and 15 respectively. These glass pulls consist of small pieces of glass, one of which is shown in Fig. 5, and they may be of any desired shape, size and thickness. The pieces of glass forming the pulls 23 and 24 are secured to the glass sheets 14 and 15 by the interposed layers of plastic material 25 and 26 respectively. The plastic layers 25 and 26 are also preferably of a synthetic resin material such as polyvinyl acetal resins. In fact, these layers of plastic may be and preferably are of the same material as the material constituting the plastic interlayer 16.

Before applying the glass pulls to the glass sheets, the laminated glass sandwich 17 is adapted to be heated and this can be accomplished by passing said sandwich through a heating oven or leer. While the glass sheets may be locally heated where the pulls are to be attached, it is preferred that the entire sheets be heated to avoid the setting up of strains in the glass. After the sandwich has been properly heated, the layers 25 and 26 of plastic material are laid upon the glass sheets 14 and 15 and the glass pulls 23 and 24 positioned thereon. It has been found that the amount of pressure which may be exerted upon the pulls by the operator with his fingers is sufficient to effect a preliminary bonding of the pulls to the glass sheets. In other words, the glass pulls are subjected to a preliminary pressing by the operator in much the same manner that the laminated glass sandwich 17 is subjected to a preliminary pressing by passing it through the apparatus illustrated in Fig. 3. As will be seen in Fig. 4, the plastic layers 25 and 26 are initially slightly larger than the glass pulls 23 and 24 and after the pulls have been attached to the glass sheets by the operator, the plastic projecting beyond the edges of the pulls is trimmed off.

After the glass pulls have been applied to the glass sheets, the sandwich 17 is adapted to be subjected to final heat and pressure treatment to effect the bonding of the glass sheets 14 and 15 and plastic interlayer 16 together. Simultaneously, the glass pulls are adapted to be firmly and permanently bonded to the glass sheets. This may be accomplished by placing one or a plurality of the sandwiches 17 with the glass pulls 23 and 24 attached thereto in an autoclave 27 (Fig. 6) where they may be supported in a suitable rack 28. The autoclave contains a suitable fluid 29 heated to the desired temperature and under a predetermined pressure. This fluid exerts a uniform pressure upon the sandwiches from all sides and effects the simultaneous bonding of the glass sheets 14 and 15 and interposed plastic layer 16 together and the glass pulls 23 and 24 to the glass sheets 14 and 15 through the interposed layers of plastic material 25 and 26.

In Fig. 7 is illustrated a finished laminated safety glass panel having glass pulls attached to opposite sides thereof. Glass panels of this character may be used in any place where it is desired to employ a sliding window, door, partition, or the like, and, in addition to being useful in limousines, taxicabs, and airplanes, may be employed in showcases or refrigerators or on furniture. By using layers of plastic material for securing the glass pulls to the glass sheets and by simultaneously uniting the glass sheets 14 and 15 with the plastic interlayer 16 and the glass pulls 23 and 24 with the glass sheets 14 and 15 in an autoclave, it will be apparent that a permanent bond will be obtained between the glass pulls and glass sheets. As a matter of fact, the glass pulls will be secured to the glass sheets just as firmly as the glass sheets themselves are bonded together by the plastic interlayer 16 so that all danger of the pulls becoming loose or detached from the glass is obviated. By using a plastic material which is resistant to discoloration by light, the layers of plastic 25 and 26 will remain permanently transparent so as not to mar the appearance of the laminated glass panel.

I claim:

1. The process of mounting glass pulls upon sheets of laminated safety glass, comprising assembling two sheets of glass and an interposed layer of plastic material to form a sandwich, subjecting said sandwich to a preliminary pressing to secure initial adhesion between the glass sheets and plastic interlayer, applying a layer of transparent synthetic resin material to one of the glass sheets, laying a glass pull of relatively smaller area than the sandwich upon said layer of synthetic resin material and applying sufficient pressure thereto to cause it to adhere to the glass sheet, and then subjecting the laminated glass sandwich and glass pull thereon to the direct action of a fluid under pressure to effect the simultaneous bonding of the glass sheets to the plastic interlayer and the glass pull to the glass sheet.

2. The process of mounting glass pulls upon sheets of laminated safety glass, comprising assembling two sheets of glass and an interposed layer of a vinyl acetal resin material to form a sandwich, subjecting said sandwich to a preliminary pressing to secure initial adhesion between the glass sheets and plastic interlayer, applying a layer of vinyl acetal resin material to one of the glass sheets, laying a glass pull of relatively smaller area than the sandwich upon said layer of vinyl acetal resin and applying sufficient pressure thereto to cause it to adhere to the glass sheet, and then subjecting the laminated glass sandwich and glass pull thereon to the direct action of a heated fluid under pressure to effect the simultaneous bonding of the glass sheets to the plastic interlayer and the glass pull to the glass sheet.

MELVIN C. KOESTER.